United States Patent
Heyduck et al.

(10) Patent No.: US 11,359,416 B2
(45) Date of Patent: Jun. 14, 2022

(54) VEHICLE DOOR WITH EXTERNAL HANDLE UNIT AND METHOD FOR MOUNTING THE SAME

(71) Applicants: Jan Heyduck, Sindelfingen (DE); Jurgen Jooss, Boblingen (DE); Martin Lindmayer, Sulz (DE); Bernd Reifenberg, Essen (DE); Michael Rhein, Monchengladbach (DE)

(72) Inventors: Jan Heyduck, Sindelfingen (DE); Jurgen Jooss, Boblingen (DE); Martin Lindmayer, Sulz (DE); Bernd Reifenberg, Essen (DE); Michael Rhein, Monchengladbach (DE)

(73) Assignee: HUF HUELSBECK & FUERST GMBH & CO. KG, Velbert (DE)

( * ) Notice: Subject to any disclaimer, the term of this patent is extended or adjusted under 35 U.S.C. 154(b) by 734 days.

(21) Appl. No.: 16/122,685

(22) Filed: Sep. 5, 2018

(65) Prior Publication Data
US 2019/0078358 A1    Mar. 14, 2019

(30) Foreign Application Priority Data
Sep. 14, 2017    (DE) .................... 10 2017 008 652.4

(51) Int. Cl.
*E05B 79/06*    (2014.01)
*E05B 79/04*    (2014.01)
(Continued)

(52) U.S. Cl.
CPC .......... *E05B 79/06* (2013.01); *E05B 63/0056* (2013.01); *E05B 79/04* (2013.01);
(Continued)

(58) Field of Classification Search
CPC ...... E05B 79/04; E05B 79/06; E05B 63/0056; E05B 85/10; E05B 85/16; E05B 85/103;
(Continued)

(56) References Cited

U.S. PATENT DOCUMENTS 6,173,535 B1 *  1/2001  Deischl .................. E05B 77/04
                                                      292/DIG. 31
6,594,861 B2 *  7/2003  Dimig .................... E05B 79/06
                                                            16/412
(Continued)

FOREIGN PATENT DOCUMENTS

DE       3304569 C1 *  7/1984  ............ F16B 37/044
DE       3620005 C1 *  9/1987  ............ B60J 5/0468
(Continued)

OTHER PUBLICATIONS

Jan. 28, 2010 Machine translation of DE 102008035059 A1 (Year: 2010).*

(Continued)

*Primary Examiner* — Christine M Mills
*Assistant Examiner* — Christopher F Callahan
(74) *Attorney, Agent, or Firm* — Fay Sharpe LLP

(57) ABSTRACT

A motor vehicle door having an external handle unit includes a support part and a handle which has on a circumference of the support part a plurality of compensating elements and on an interior side of the door shell a fixing plate having a plurality of fixing points. The compensating elements are embodied to permit, by means of a fixing screw that is to be screwed in, both a compensating movement in the Y direction, and, due to a floating mounting, a compensation in the X and Z directions.

5 Claims, 2 Drawing Sheets

(51) Int. Cl.
  *E05B 85/16* (2014.01)
  *E05B 63/00* (2006.01)
  *E05B 17/06* (2006.01)
  *F16B 5/02* (2006.01)

(52) U.S. Cl.
  CPC .............. *E05B 85/16* (2013.01); *E05B 17/06* (2013.01); *F16B 5/0233* (2013.01)

(58) Field of Classification Search
  CPC ...... E05B 85/107; E05B 17/06; F16B 5/0233; Y10S 292/53
  See application file for complete search history.

(56) References Cited

U.S. PATENT DOCUMENTS

| | | | | |
|---|---|---|---|---|
| 8,720,118 | B2 * | 5/2014 | Meyers | E05B 77/04 49/503 |
| 9,062,478 | B2 * | 6/2015 | Bingle | E05B 81/28 |
| 2015/0233154 | A1 * | 8/2015 | Smart | E05B 81/90 70/237 |
| 2016/0010368 | A1 * | 1/2016 | Tanoguchi | B60J 5/0493 16/412 |

FOREIGN PATENT DOCUMENTS

| | | | | |
|---|---|---|---|---|
| DE | 102004044055 A1 * | 3/2006 | | F16B 5/025 |
| DE | 10 2008 035 059 A1 | 1/2010 | | |
| DE | 10 2012 221 228 A1 | 5/2014 | | |
| DE | 10 2015 011 744 A1 | 3/2016 | | |
| DE | 10 2015 209 851 A1 | 12/2016 | | |
| FR | 3034802 A1 * | 10/2016 | | E05B 85/107 |
| WO | WO 2016/188694 A1 | 12/2016 | | |
| WO | WO-2017069858 A1 * | 4/2017 | | E05B 77/36 |
| WO | WO 2017/211550 A1 | 12/2017 | | |

OTHER PUBLICATIONS

May 22, 2014 Machine translation of DE 102012221228 A1 (Year: 2014).*

European Search Report of Related European Application Serial No. EP 18187061, dated Jan. 18, 2019, 10 pages.

* cited by examiner

VEHICLE DOOR WITH EXTERNAL HANDLE UNIT AND METHOD FOR MOUNTING THE SAME

BACKGROUND

The invention relates to a vehicle door for a motor vehicle having an external handle unit that comprises a support part and a handle, wherein the support part may be fixed from inside to the door shell and the door shell has a through-hole for the handle, wherein compensating elements for compensating tolerance in three axes are provided between the support part and the door shell. The invention furthermore relates to a mounting method and to a motor vehicle provided with such a vehicle door.

A vehicle door having an external handle unit is known from DE 10 2015 209 851 A1. Furthermore, a compensating element for two components to be fixed at a distance from one another is known from DE 10 2012 221 228 A1.

In the past, the external handle unit has been attached to the vehicle door in two work steps. The support part, together with a door lock, is attached from the interior side of the door. Then the handle is mounted from outside, wherein due to production tolerances during the production of the support part a tolerance compensation is required later, especially since the handle is mounted with a small circumferential gap in the through-hole of the door shell and thus small gap differences are already noticeable. A tolerance compensation in the X, Y, and Z directions (the X direction is the direction of travel, the Y direction is horizontally transverse thereto, the Z direction is the vertical direction) is therefore necessary and requires corresponding mounting time.

The object of the invention is to simplify the mounting of the external handle unit on the vehicle door.

BRIEF SUMMARY

The invention results from the features of the independent claims. Advantageous refinements and embodiments are the subject-matter of the dependent claims.

The object with respect to the vehicle door is attained in that a plurality of compensating elements are arranged on the edge of the support part, furthermore a fixing plate, having a through-hole for the handle and a plurality of fixing points provided with female threads and flush with the compensating elements, is attached on the interior side of the door shell, wherein the compensating elements are embodied to permit, by means of a fixing screw that is to be screwed in, both a compensating movement in the Y direction of the vehicle door and, due to a floating mounting, a compensation in the X and Z directions.

With respect to the mounting method for an external handle unit on a vehicle door, the object is attained using the following method steps:
- the handle of the external handle unit is inserted from the interior side of the door through the through-hole in the fixing plate and in the door shell until it meets the door shell,
- an aligning template is inserted from the exterior side of the door into a gap between the handle and the edge of the through-hole in the door covering,
- the fixing screws of the compensating elements are caused to engage with the female threads on the fixing plate,
- the fixing screws are tightened.

The embodiments make it possible to fix the entire external handle unit to the already mounted handle, in one work step, from the door interior and at the same time to perform a tolerance compensation in all three axes (X, Y, Z). Thus, the mounting of the external handle unit is simplified.

The door shell must merely be equipped with the fixing plate with the female threads for the compensating elements, which occurs during the manufacture of the door. The female threads may be molded (using metal sheet deformation) or welded onto the fixing plate.

Defined positioning is achieved in the Y direction due to the one stop of the external handle unit on the door shell; moving the fixing screws of the compensating elements also attains both the tolerance compensation of the support part in all three directions in that the compensating elements are floatingly attached to the support part, wherein a constant annular gap is provided between the handle and the through-hole in the external covering due to the aligning template on the handle-side.

According to one advantageous refinement of the invention, three or four compensating elements are provided. Three compensating elements, that is, attaching points for the external handle unit, are normally sufficient.

According to one advantageous refinement of the invention, 3 or 4 aligning projections for meeting a door covering are embodied on the support part, distributed to the side of the handle on the circumference. These are arranged close to the handle and have an extension such that they reach through the through-hole in the fixing plate to a door covering of the vehicle door and thus permit exact alignment in the Y direction, since there are no other components with tolerances present and the Y alignment is required with respect to the door covering so that the exterior surface of the handle will be flush with the exterior of the door covering.

BRIEF DESCRIPTION OF THE DRAWINGS

Additional advantages, features, and details result from the following description, in which at least one exemplary embodiment is described in detail, in some cases referencing the drawings. Identical, similar, and/or functionally identical parts are provided with the same reference numbers.

DETAILED DESCRIPTION

Figure 1:
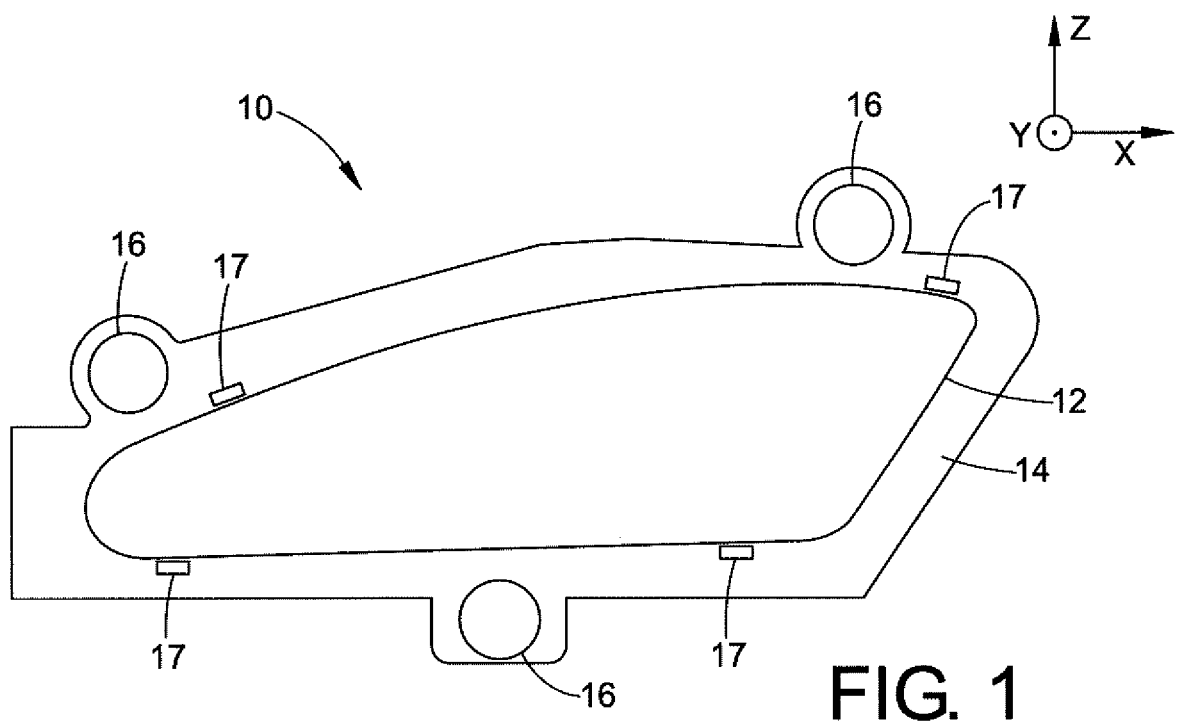
FIG. 1 is a view of an external handle unit.

In FIG. 1 is a schematic depiction, in a view from the outside, of an external handle unit 10 that comprises a handle 12 and a support part 14 in which is housed a mechanism and a servodrive (not shown) for a door lock connected thereto by means of a Bowden cable. If it is a driver-side door, also included is a cylinder lock (not shown). A plurality (in this case 3, but it may also be another plurality) of compensating elements 16 (shown in greater detail in FIG. 3) are attached on the circumference of the support part 14. The compensating elements 16 may be attached to the support part 14 in advance by means of a latching lug or in some other manner. Furthermore, attached or molded to the support part 14, surrounding the handle, are three or four aligning projections 17 that should be positioned in the vicinity of the compensating elements 16. The aligning projections extend a few millimeters in the Y direction and provide contact with the interior of a door covering 19 depicted in FIG. 2.

Figure 2:
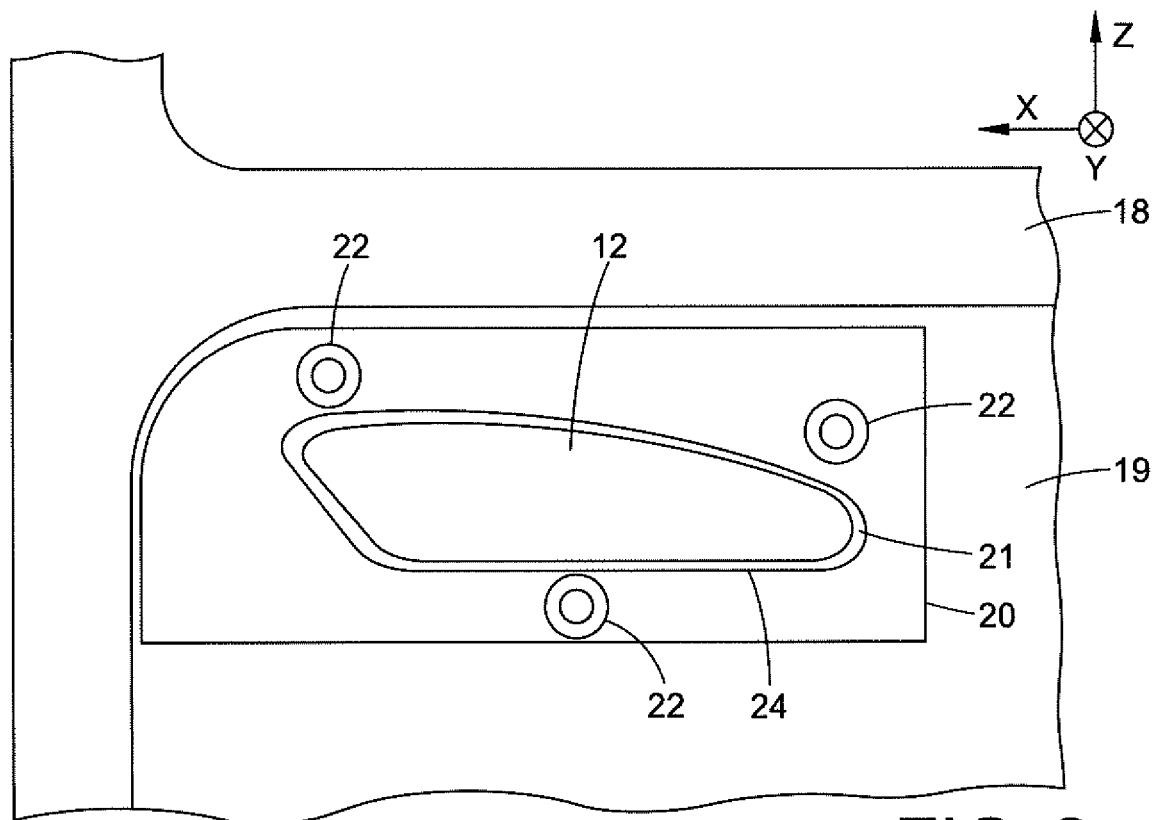
FIG. 2 is a view of a door shell from the interior side.

FIG. 2 depicts a door shell 18, that has a door covering 19, from the interior side. A fixing plate 20, embodied as reinforcing sheet, is fixed to the door covering, for example by means of point welding. The fixing plate 20 comprises threaded sleeves 22 that are welded to the fixing plate 20 and define female threads for the compensating elements 16. Screw nuts may also be used instead of threaded sleeves 22, or the female threads are molded in the fixing plate 20 produced from sheet. The fixing plate 20 has a through-hole 24 that preferably corresponds to the outer contour of the handle 12 but is larger enough that the aligning projections 17 extend therethrough and can reach the door covering 19 visible under the through-hole 24 and, during the course of mounting the exterior handle unit 10, its handle 12 may be inserted through the through-hole 24 without any risk of damage. The door covering 19 also has a through-hole 21 that corresponds to the outer contour of the handle 12 plus a constant gap of preferably 0.5-1 mm.

Figure 3:
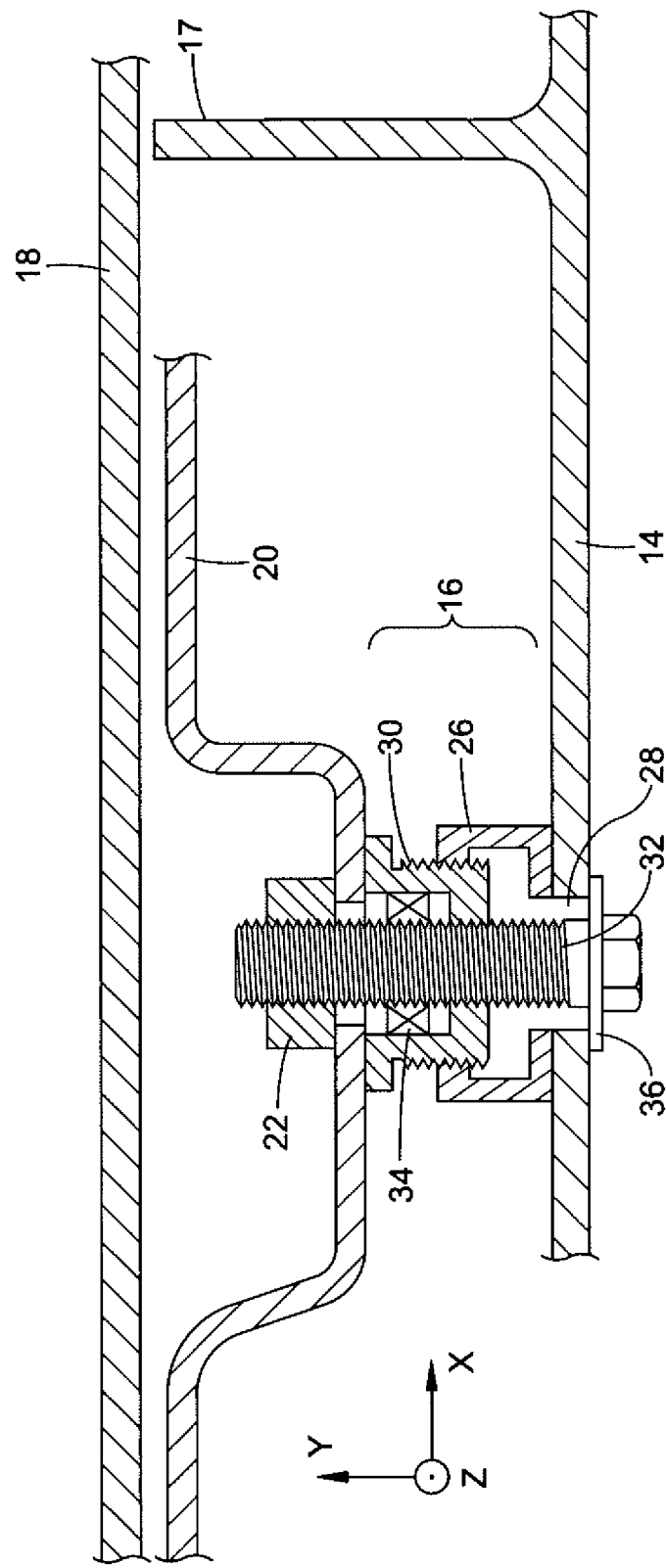
FIG. 3 is a sectional depiction through a compensating element.

FIG. 3 is a sectional depiction of an embodiment of the compensating element 16. It includes a base element 26 that is attached to the support part 14 via fixing means (not shown), for example a latching lug connector, and has a bore 28 that is large enough that at first a floating movement between the support part 14 and base element 26 is possible in the X-Z plane. The base element 26 is engaged with a fixing sleeve 30 via a screw connection.

A fixing screw 32 is frictionally engaged, via a spring connection 34, with the fixing sleeve 30 and initially carries the latter along with it when it is being screwed in, wherein the fixing sleeve 30 is carried along via the thread in the base element 26 in the Y direction to the fixing plate 20. As soon as the fixing sleeve 30 meets the fixing plate 20, the spring connection 34 disengages and the fixing screw 32 engages with the threaded sleeve 22. The fixing screw 32 can continue to be screwed into the threaded sleeve 22 until a screw head 36 meets the support part 14. Up to this point it is possible for the external handle unit 10 to be displaced relative to the fixing plate 20 in the X-Z plane.

For mounting the external handle unit 10, the handle 12 thereof is inserted from the interior side of the door through the through-hole 24 in the fixing plate 20 and the through-hole 21 in the door covering 19 until the aligning projections 17 meet the door covering 19 on the interior. Then an aligning template (not shown) is inserted from the exterior side of the door into a gap between the handle 12 and the edge of the through-hole 21 in the door covering 19, so that the external door unit is fitted in the X-Z plane. Then the fixing screws 32 of the aligning elements 16 are caused to engage with the female threads 22 on the fixing plate 20 so that fixing sleeves 30 are moved towards the fixing plate 20 via friction fit. Tightening the fixing screw 32 with a defined torque in the threaded sleeve 22 clamps the support part 14 to the fixing plate 20 via the base element 26 and the fixing sleeve 30.

Although the invention was illustrated in greater detail and explained in detail using preferred exemplary embodiments, the invention is not limited by the disclosed examples and the person skilled in the art may derive other variations herefrom without leaving the protective scope of the invention. It is therefore clear that there are a great number of possible variations. It is also clear that embodiments identified by way of example actually only represent examples that are not in any way to be construed as limiting the scope of protection, potential applications, or the configuration of the invention. On the contrary, the description in the foregoing and the description of the figures make it possible for the person skilled in the art to implement the exemplary embodiments specifically, wherein the person skilled in the art, given knowledge of the disclosed inventive thought, may undertake a wide variety of modifications, for instance with respect to the function or the arrangement of individual elements identified in an exemplary embodiment, without leaving the scope of protection defined by the claims and their legal equivalents, such as, for example, refining explanations in the description.

The invention claimed is:

1. A vehicle door for a motor vehicle having an external handle unit comprising:
    a support part and a handle, wherein the support part is fixed from inside a door shell and the door shell has a door covering and a through-hole for the handle,
    a plurality of compensating elements for compensating tolerance in three axes (X-Y-Z) between the support part and the door shell, wherein the plurality of compensating elements is arranged on a circumference of the support part,
    a fixing plate, having a through-hole for the handle and a plurality of fixing points provided with female threads and flush with the compensating elements, attached on an interior side of the door shell,
    wherein the compensating elements allow, by means of a fixing screw that is to be screwed in, both a compensating movement in the Y direction of the vehicle door, and, due to a floating mounting, a compensation in the X and Z directions,
    wherein three aligning projections for meeting the door covering are provided on the support part, distributed to the side of the handle on the circumference,
    wherein the through-hole in the fixing plate surrounds and corresponds to the outer contour of the handle plus a gap of about 3 mm to 10 mm around the outer contour of the handle,
    wherein for mounting the external handle unit, the handle thereof is configured to be inserted from the interior side of the door through the through-hole in the fixing plate and the through-hole in the door covering until the aligning projections abut against the door covering on the interior, and
    each compensating element has a hollow-cylindrical base element that is attached to the support part and that is arranged resting on the support part and a fixing sleeve that is in threaded engagement with the base element and that is frictionally engaged, via a spring element, with the fixing screw, so that a rotation of the fixing screw causes a movement of the fixing sleeve towards the fixing plate and further rotation of the fixing screw disengages the spring element and the fixing screw, as soon as the fixing sleeve abuts against the fixing plate, so that the fixing screw engages with the fixing point and the fixing screw can continue to be screwed into the fixing point until the back of a screw head abuts against the support part for fixing it.

2. The vehicle door according to claim 1, wherein the plurality of compensating elements include three compensating elements.

3. The vehicle door according to claim 1, wherein the female threads on the fixing plate are formed by attached screw nuts or threaded sleeves.

4. The vehicle door according to claim 3, wherein the screw nuts or threaded sleeves are welded to the fixing plate.

5. The vehicle door according to claim 1, wherein the through-hole in the door shell corresponds to the outer contour of the handle plus a constant narrow gap of about 0.5-1 mm.

* * * * *